US007994473B2

(12) United States Patent
Köster

(10) Patent No.: US 7,994,473 B2
(45) Date of Patent: Aug. 9, 2011

(54) MASS SPECTROMETER WITH AN ELECTROSTATIC ION TRAP

(75) Inventor: Claus Köster, Lilienthal (DE)

(73) Assignee: Bruker Daltonik GmbH, Bremen (DE)

( * ) Notice: Subject to any disclaimer, the term of this patent is extended or adjusted under 35 U.S.C. 154(b) by 793 days.

(21) Appl. No.: 12/098,646

(22) Filed: Apr. 7, 2008

(65) Prior Publication Data

US 2011/0042562 A1 Feb. 24, 2011

(30) Foreign Application Priority Data

Apr. 12, 2007 (DE) ......................... 10 2007 017 237
May 29, 2007 (DE) ......................... 10 2007 024 858

(51) Int. Cl.
*B01D 59/44* (2006.01)
*H01J 49/00* (2006.01)

(52) U.S. Cl. ........ 250/283; 250/281; 250/282; 250/287; 250/288; 250/290; 250/291; 250/292

(58) Field of Classification Search .......... 250/281–283, 250/287, 288, 290–292
See application file for complete search history.

(56) References Cited

U.S. PATENT DOCUMENTS 5,572,035 A 11/1996 Franzen
5,763,878 A 6/1998 Franzen
5,886,346 A 3/1999 Makarov
6,998,609 B2 2/2006 Makarov et al.
7,391,021 B2 6/2008 Stoermer et al.
7,399,962 B2 7/2008 Makarov
2007/0023629 A1 * 2/2007 Makarov ....................... 250/282

FOREIGN PATENT DOCUMENTS

GB 2 404 784 A 2/2006
WO WO 2007/000587 A2 1/2007

OTHER PUBLICATIONS

Kingdon, K.H., "A Method for the Neutralization of Electron Space Charge by Positive Ionization at Very Low Gas Pressures," Neutralization of Electron Space Charge, Research Laboratory, General Electric Company, Schenectady, NY, 1922, pp. 408-418.
DE 10 2006 035 277.7, English translation of German application previously filed but never published, and which has been withdrawn.
Jun. 2, 2008 Office Action for corresponding German application No. 10 2007 024 858.1.
Jul. 31, 2008 Search Report for corresponding British application No. GB 2404784.

* cited by examiner

*Primary Examiner* — Robert Kim
*Assistant Examiner* — Meenakshi S Sahu
(74) *Attorney, Agent, or Firm* — Law Offices of Paul E. Kudirka

(57) ABSTRACT

In a mass spectrometer with an electrostatic ion trap, the electrostatic ion trap has an outer electrode with an ion-repelling electric potential applied to it and a plurality of inner electrodes with ion-attracting potentials applied to each inner electrode. The outer electrode and the inner electrodes are shaped and arranged in such a way that a harmonic electric potential is formed in one spatial direction and, perpendicular to this spatial direction, an electric potential is formed in which ions move in stable, radial trajectories.

20 Claims, 9 Drawing Sheets

MASS SPECTROMETER WITH AN ELECTROSTATIC ION TRAP

BACKGROUND

The invention relates to a mass spectrometer with an electrostatic ion trap. Various types of mass spectrometers can be used for mass spectrometric analysis. Known types of mass spectrometers include ion trap mass spectrometers, such as ion cyclotron resonance mass spectrometers (ICR-MS) and electrostatic ion traps.

All mass spectrometers, however, can only determine the mass to charge ratio of an ion. Below, the term "mass of an ion" or "ion mass" therefore refers to the ratio of the mass m to the number of elementary charges z of the ion, i.e. the mass-to-elementary charge ratio m/z. Among other criteria, the quality of a mass spectrometer is primarily determined by its mass resolution and mass accuracy. The term "mass accuracy" here relates to both the statistical variation around a measured mean value and the systematic deviation of the measured mean value from the true value.

In an ion cyclotron resonance mass spectrometer, ions are confined radially by a strong, homogenous magnetic field and axially by an electric field. The strong magnetic field forces ions onto circular trajectories perpendicular to the magnetic field, where they cycle with so-called ion cyclotron frequency. The ion cyclotron frequency is proportional to the strength of the magnetic field and inversely proportional to the ion mass. By applying a high frequency electric voltage to appropriate electrodes, ions of a certain mass can be excited and move as a coherent ion package on a spiral trajectory with increasing radius. The trajectory radius of an ion package is increased until the ions pass close to detector plates so that they induce image charges on these detector plates. The image charges or, respectively, induced voltages are detected as a function of time; the time signal contains information on ion cyclotron frequencies of all orbiting ion packages and number of ions in the respective ion packages. A Fourier transformation can be used to transform the measured time signal into a frequency spectrum, which can be converted into a mass spectrum via the known mass dependence of the ion cyclotron frequency. With an ion cyclotron resonance mass spectrometer, a very high mass resolution of more than 1,000,000 can be achieved for measurement times of about one second. However, the manufacture and operation of an ion cyclotron resonance mass spectrometer with high mass resolution are quite costly because only superconducting magnets with helium cooling are able to generate magnetic fields with necessary strength of approximately 10 Tesla.

From an early publication by Kingdon (Physical Review, 21, 1923, p. 408-418: "A method for the neutralization of electron space charge by positive ionization at very low gas pressures") it has already been known that ions can be stored in an electrostatic field if they move with sufficient kinetic energy around an electrode with an ion-attracting electric potential. In U.S. Pat. No. 5,886,346 A, another electrostatic ion trap is disclosed, which has been marketed under the name Orbitrap™. The Orbitrap™ consists of a single, spindle-shaped, inner electrode and a coaxial outer electrode, wherein an ion-repelling electric potential is applied to the outer electrode and an ion-attracting electric potential is applied to the inner electrode. With the aid of an ion-focusing system, ions are injected as ion packages tangentially to the inner electrode, and move between the inner and outer electrode in a hyperlogarithmic electric potential. The kinetic injection energy of the ions is selected such that attracting forces inside the electrostatic ion trap and centrifugal forces balance each other. The injected ions therefore move on circular trajectories. In the direction along the trap axis, the Orbitrap™ comprises a harmonic potential. The oscillation frequency of ions in a harmonic potential is inversely proportional to the square root of their mass. Like in an ion cyclotron resonance mass spectrometer, ion packages oscillating inside the electrostatic ion trap induce image charges and corresponding voltages which are measured as a function of time. The mass resolution of an Orbitrap™ is currently around 100,000. The advantage of the Orbitrap™ compared to an ion cyclotron resonance mass spectrometer is that it does not require a superconducting magnet, and thus the device-related complexity and costs for operation are less. However, the mechanical specifications concerning the electrode system are very high. Moreover, the injection of ions is quite critical because ions of different masses have to be injected at nearly the same time in order to be stored in the Orbitrap™. A further challenge consists in the requirement that the kinetic energy of ions to be injected must vary only within a small range.

SUMMARY

The invention consists in having an electrostatic ion trap comprising an outer electrode with an ion-repelling electric potential and at least two inner electrodes with ion-attracting electric potentials. The outer electrode and the inner electrodes are shaped and arranged in such a way that the electric potential between the outer electrode and the inner electrodes is described by a superposition of partial electric potentials of the following form: $$U(x, y, z) = U_o + U_C \cdot \ln\left[\frac{(X^2+Y^2)^2 - 2\cdot b^2\cdot(X^2-Y^2)+b^4}{a^4}\right] + k_x\cdot x^2 + k_y\cdot y^2 + k_z\cdot z^2.$$

Here, x, y and z are Cartesian coordinates. X and Y are the Cartesian coordinates x and y shifted by $x_o$ and $y_o$ respectively and rotated through the angle α:

$$X=(x+x_o)\cdot\cos(\alpha),\ Y=(y+y_o)\cdot\sin(\alpha).$$

The individual partial electric potentials are each defined by parameters $x_o$, $y_o$ and α and also a, b, $U_c$, $U_o$, $k_x$, $k_y$ and $k_z$. The radial motion of ions is independent of their motion along the z-axis. The parameter $k_z$ is always greater than zero, so all partial electric potentials form a harmonic electric potential along the z-axis and ions carry out harmonic oscillations along the z-direction. The sum of parameters $k_x$, $k_y$ and $k_z$ is equal to zero. The parameter b is not equal to zero for any of the partial electric potentials, thus the electric potential inside the electrostatic ion trap has at least two poles.

The electric potential according to the invention can be generated by shaping and arranging the outer electrode and the inner electrodes so that the inner surface of the outer electrode and the surface of the inner electrodes correspond to equipotential surfaces of the electric potential. An electric potential superposed of more than one partial electric potential can be generated in the same way with three or more inner electrodes. Instead of reproducing complete equipotential surfaces, the outer electrode and/or the inner electrodes can also consist of a large number of segments which are shaped, arranged and supplied with voltages such that the appropriate electric potential is generated.

Ions being introduced from the outside or generated internally are stored in the electrostatic ion trap in all three spatial directions by an appropriate selection of above parameters. The radial motion along the x- and y-directions is more complex than the decoupled harmonic motion in the z-direction. Different types of stable radial trajectories are possible depending on the number and arrangement of the inner electrodes, the starting position and the initial velocity of injected ions, such as circular or elliptical trajectories or trajectories in the form of a lemniscate. In FIGS. 2B, 4A and 4B, several radial trajectories are shown as projections onto the x-y plane for a preferred electrode system with two spindle-shaped inner electrodes. FIG. 5 shows a more complex radial trajectory in an electrode system consisting of four inner electrodes resembling the shape of a cloverleaf.

In addition to the outer electrode and the inner electrodes, the electrode system of an electrostatic ion trap according to the invention can further comprise auxiliary electrodes, which can be arranged on one or more supports and supplied with electric voltages in such a way that they essentially do not disturb the electric potential inside the electrostatic ion trap. The auxiliary electrodes can be used to enclose the electrostatic ion trap if the outer electrode does not completely surround the inner electrodes.

The voltage supply providing electric potentials to the outer electrode, inner electrodes, segments of the outer and inner electrodes and to the auxiliary electrodes can be designed in such a way that it can switch or continuously set up electric potentials applied to the different electrodes. Electrodes or segments thereof can be temporarily switched to ground potential while ions are being injected in order to introduce them with appropriate starting conditions into a field-free electrode system. Auxiliary electrodes can further divide the electrostatic ion trap into different regions such that the electric storage potential still exists in a first region whereas a second region of the electrostatic ion trap is field-free. After injection, electric potentials are switched back or settled to the electric storage potentials so that injected ions remain stored in the electrode system.

The voltage between the outer electrode and one of the inner electrodes is preferably between 1 kilovolt and 50 kilovolts; particularly preferred is between 5 kilovolts and 25 kilovolts, and especially around 10 kilovolts.

A preferred electrostatic ion trap according to the invention comprises of an outer electrode and two spindle-shaped inner electrodes generating a electric potential of the form:

$$U(x, y, z) = U_o + U_C \cdot \ln\left[\frac{(x^2+y^2)^2 - 2\cdot b^2\cdot(x^2-y^2) + b^4}{a^4}\right] - \frac{k}{2}\cdot(x^2+y^2) + k\cdot z^2,$$

wherein the outer electrode and the two spindle-shaped inner electrodes are shaped and arranged such that the inner surface of the outer electrode and the surface of the spindle-shaped inner electrodes each correspond to equipotential surfaces of the above electric potential. Both inner electrodes are preferably provided with the same ion-attracting electric potential. The parameters a and b determine the radial geometry of the electrode system. Here, the parameter b corresponds to the distance of the spindle-shaped inner electrode from the z-axis, more precisely to the distance between the axis of the spindle and the z-axis. The parameter $U_c$ is proportional to the voltage between the outer electrode and the inner electrodes. The parameter k determines the harmonic motion of the ions along the z-axis and is also proportional to the voltage between the outer electrode and the inner electrodes.

A first way to obtain a mass-dependency is to measure the oscillation frequency of ions along the z-direction. For this to be possible, ions of the same mass must essentially oscillate as a coherent ion package along the z-direction, or at least have a limited spatial distribution for part of time. The great advantage of a harmonic potential consists in the fact that ions of the same mass but different initial velocities have the same period length so that, after one oscillation cycle, an ion package is spatially and temporally focused again, i.e. the ions in an ion package move coherently for a part of each oscillation cycle. It is a basic condition for measuring the oscillation frequency along the z-axis that ions comprise stable trajectories perpendicular to the z-direction during the measurement and do not collide with one of the electrodes of the electrode system.

The period length of a harmonic oscillation is proportional to the square root of the ion mass and inversely proportional to the square root of parameter k. The mass resolution is proportional to the number of oscillation cycles measured. To increase the mass resolution, ion packages must be stored for a longer time in the electrostatic ion trap. With typical oscillation frequencies of several hundred kilohertz, one can easily obtain a high mass resolution of more than 50,000 in a measuring time of less than one second. It is perfectly possible to achieve a mass resolution of more than 100,000 and up to 1,000,000.

Each ion package oscillating inside the electrostatic ion trap induces a periodic signal in an ion detector, which is electronically amplified and measured as a function of time. The ion detector comprises detection elements, such as detection coils, in which ion packages induce voltages as they fly through, or detection electrodes, for example segments of the outer electrode or inner electrodes, in which ion packages induce image charges as they fly past.

A coherent motion of ion packages is necessary for their detection. This can be achieved by injecting ions into the electrostatic ion trap as ion packages with a narrow spatial distribution along the direction of oscillation. With an electrode system having two spindle-shaped inner electrodes, ions are preferably introduced in the plane of symmetry (y-z plane) between the two inner electrodes, where they oscillate along the y-axis between opposite sides of the outer electrode. If ions are introduced outside the potential minimum, they immediately start to oscillate along the z-axis as soon as they are inside of the electrostatic ion trap. A pulsed introduction of ions limits the initial spatial broadening of ion packages along the z-axis. An ion package can be detected if the initial broadening is less than the oscillation amplitude in z-direction. Since the ions have a certain kinetic energy when they are introduced into the electric field of the electrostatic ion trap, the electric storage potential has to be locally decreased, where ions are injected, or it has to be increased after the injection to prevent ions from colliding with the outer electrode.

When ions are transferred into an ion trap, they generally pass an acceleration voltage. Lighter ions are therefore faster than heavier ions of the same kinetic energy and reach the ion trap before heavier ions. This mass-dependent velocity dispersion limits the range of ion masses which can be transferred into the electrostatic ion trap and analyzed with one injection. The electric potential applied to the electrodes of the electrostatic ion trap must at the latest be switched back to the electric storage potential when the lightest ions to be analyzed have completed their first oscillation cycle. After that time, the electric storage potential inhibits the introduction of ions which reach the electrostatic ion trap at later times. In patent application DE 10 2006 035 277.7, however, an ion-optic is described which allows the introduction of ions with different masses into an ion trap, wherein they reach the interior of the ion trap at the same time and with the same kinetic energy. To achieve this, ions are mass-selectively extracted from an ion storage device upstream of the ion trap in such a way that the heavier ions are extracted before the lighter ions. The mass-selective extraction compensates for the flight-time effect of the acceleration voltage. An ion-optic of this type makes it possible to introduce ion packages with a large range of masses.

A further way of achieving a coherent motion of ion packages consists in quasi-continuously introducing ions directly at the potential minimum of the harmonic potential. Here, the ions move with small amplitudes according to their initial energy in z-direction. It is preferable to continuously decrease the electric potential at the inner electrodes to ensure that the ions introduced do not collide with the outer electrode as they return to the point of injection. After ions are introduced and stored in the potential minimum, they are excited to harmonic oscillations, for example by using a high frequency electric dipole field along the z-axis. This electric excitation field can be generated by a high frequency voltage between segments of the outer electrode. Frequency mixtures being necessary for the excitation of different ion masses are known from ion cyclotron resonance mass spectrometers. A temporally pulsed dipole field along the z-axis can also be used for an excitation.

In contrast to the Orbitrap™, ions can be introduced into an electrostatic ion trap according to the invention with almost no kinetic energy if they are introduced close to the plane of symmetry between the two inner electrodes, because no centrifugal force for a rotational motion around a central inner electrode is needed to confine ions. The introduction of the ions into an electrostatic ion trap according to the invention is substantially simplified.

A second way to obtain a mass-dependency is to measure the oscillation frequency of the radial ion motion. To achieve this, ions of each single ion mass must (at least temporarily) move as coherent ion packages in the radial direction. There are different electrode geometries in which, under optimum initial conditions (starting position, starting direction and kinetic energy), the radial period length for a single ion remains constant. The radial period length, however, fluctuates from cycle to cycle if the initial conditions differ from the optimum initial conditions. If an ion package is introduced into the electrostatic ion trap under real conditions, the initial conditions of ions in an ion package will naturally vary. The ion package therefore spreads out spatially and is never completely focused again, as is the case of the harmonic potential. However, the spatial broadening does not increase with the number of cycles without limit. Although the non-linear radial motion does usually not seem to allow a complete focusing, a type of averaged time focusing with an upper limit to spatial broadening is found. Moreover, electrode geometries exist in which, for real achievable initial conditions, the average values of the radial period lengths differ so little that a mass resolution of more than 10,000 can be possible by averaging over a sufficiently large number of radial cycles.

In addition to the electrostatic ion trap, a mass spectrometer according to the invention also comprises an ion source and, optionally, an ion guide system according to prior art as well. An ion guide system can transfer ions from the ion source to the electrostatic ion trap and, if necessary, can store ions, form ion packages and/or ion beams in time and space, select ions according to their mass or fragment them.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

Figure 1:
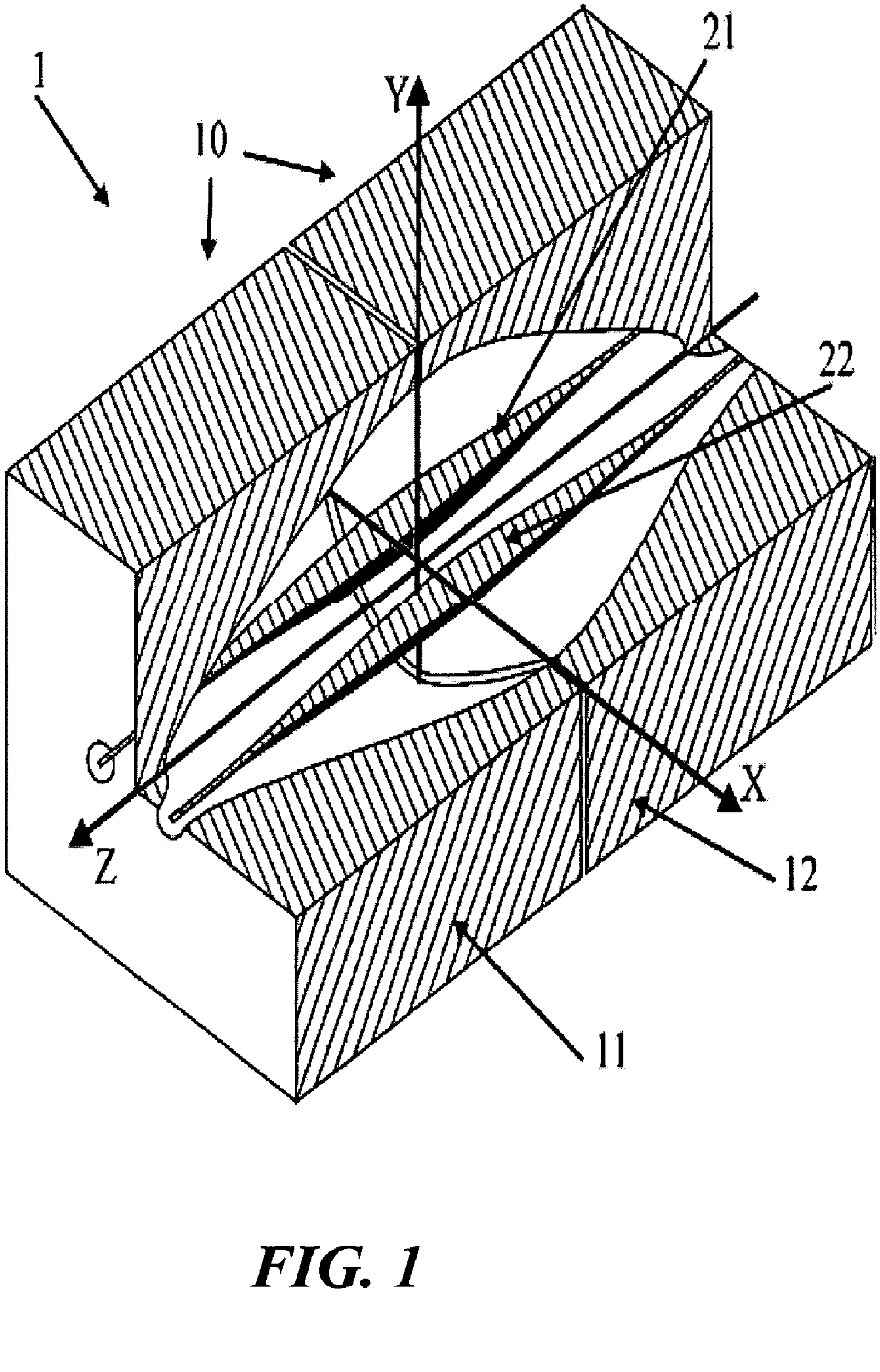
FIG. 1 shows a partial cutaway drawing of an electrode system (1) of an electrostatic ion trap with a segmented outer electrode (10) and two spindle-shaped inner electrodes (21, 22) in a three-dimensional representation.

FIG. 1 shows an embodiment of an electrode system (1) for an electrostatic ion trap in a three-dimensional partial cutaway representation. The electrode system (1) comprises a segmented outer electrode (10) and two spindle-shaped inner electrodes (21, 22). The outer electrode (10) is divided into the outer electrodes (11) and (12) by the x-y plane. In FIG. 1, the electrode system (1) is cut away along the z-axis in the first quadrant of the x-y plane.

The outer electrodes (11, 12) are provided with an ion-repelling electric potential, whereas both inner electrodes (21, 22) are provided with an ion-attracting electric potential. The voltage between the outer electrodes (11, 12) and the inner electrodes (21, 22) is preferably between 1 kilovolt and 50 kilovolts; particularly preferred between 5 kilovolts and 15 kilovolts, and especially around 10 kilovolts.

The outer electrodes (11, 12) and both inner electrodes (21, 22) are shaped and arranged such that the inner surface of the outer electrodes (11, 12) and the surface of the inner electrodes (21, 22) each correspond to an equipotential surface of the electric potential U(x,y,z).

$$U(x, y, z) = U_o + U_C \cdot \ln\left[\frac{(x^2+y^2)^2 - 2\cdot b^2\cdot(x^2-y^2) + b^4}{a^4}\right] - \frac{k}{2}\cdot(x^2+y^2) + k\cdot z^2$$

The parameters a and b determine the radial geometry of the electrode system (1). The parameter b is not equal to zero and roughly corresponds to the distance of the inner electrodes

(21) and (22) from the z-axis, more precisely to the distance between the spindle axis and the z-axis. The parameter $U_c$ is proportional to the voltage between the outer electrodes (11, 12) and the inner electrodes (21, 22). The parameter k determines the motion of ions along the z-direction and is also proportional to the voltage between the outer electrodes (11, 12) and the inner electrodes (21, 22).

The distance between the two inner electrodes (21, 22) is preferably less than 200 millimeters; particularly preferred is less than 50 millimeters, and especially around 10 millimeters. The ratio of the distance between the inner electrodes (21, 22) and their length can be 1:2, 1:5, 1:10, 1:20, for example. However, geometries are also possible where the distance between the inner electrodes (21, 22) is greater than the length of the inner electrodes (21, 22), for example 2:1 or 5:1. A mass spectrometer according to the invention with this type of electrostatic ion trap can have a very compact design.

The parameter k, the ion mass m, and the charge q of the ion determine the oscillation frequency f of the harmonic oscillation along the z-direction:

$$f = \frac{1}{2\cdot\pi}\sqrt{\frac{2\cdot k\cdot q}{m}}$$

The parameter k preferably has values between 0.1 and $100\times10^6$ volts per square meter. With a preferred value of approximately $7\times10^6$ volts per square meter, the oscillation frequency is about 585 kilohertz for a singly charged ion of mass 100 u (u=unified atomic mass unit). These high oscillation frequencies make it possible to achieve a mass resolution of over 50,000 in a measuring time of less a second. Maximum mass resolutions of more than 100,000 up to 1,000,000 are achievable.

Figure 2A:
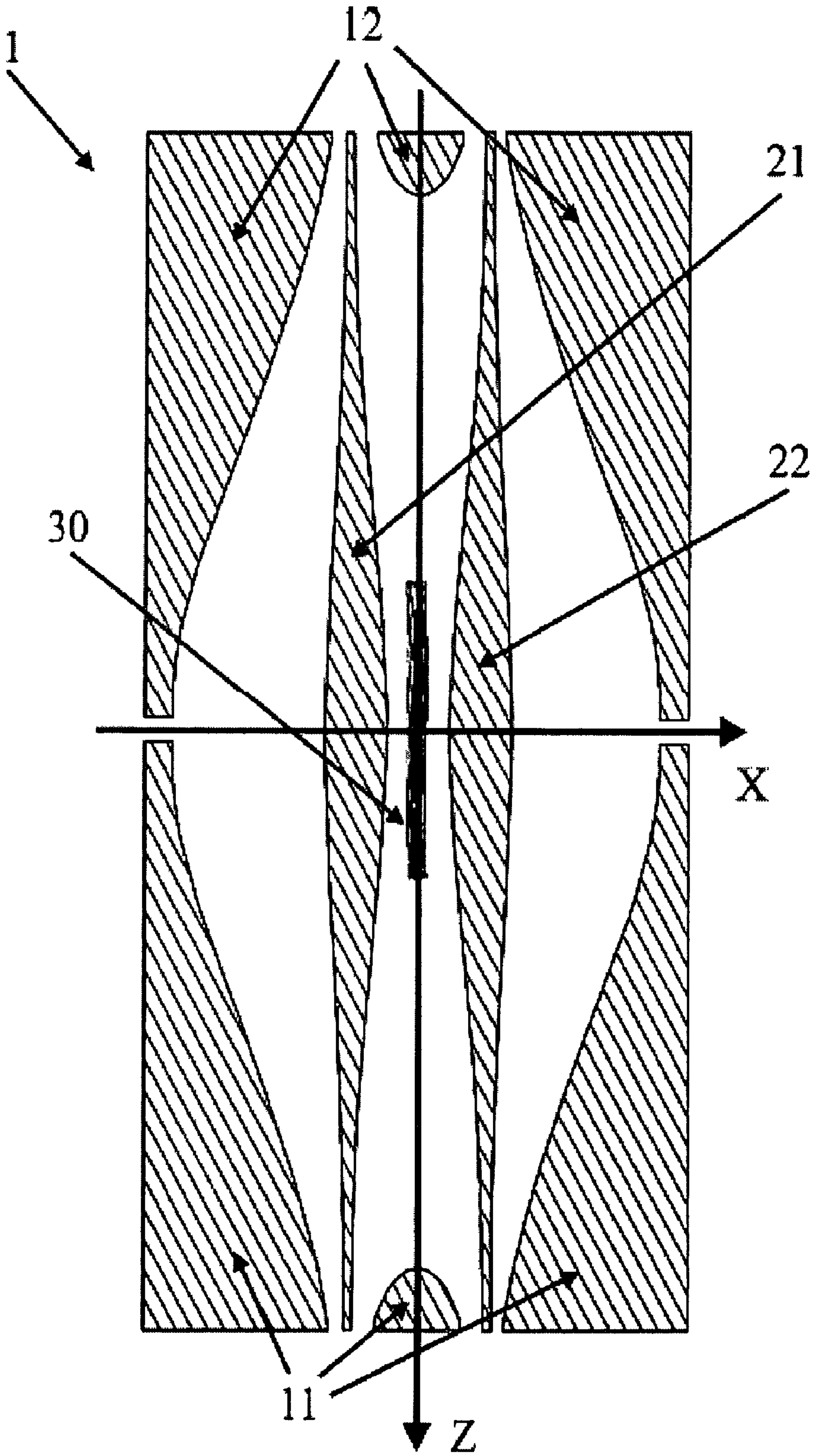
FIGS. 2A to 2C show cross-sections of the electrode system (1) in the x-z plane, x-y plane and y-z plane respectively. The trajectories (30) of stored ions are shown as a projection onto the respective plane.
Figure 2B:
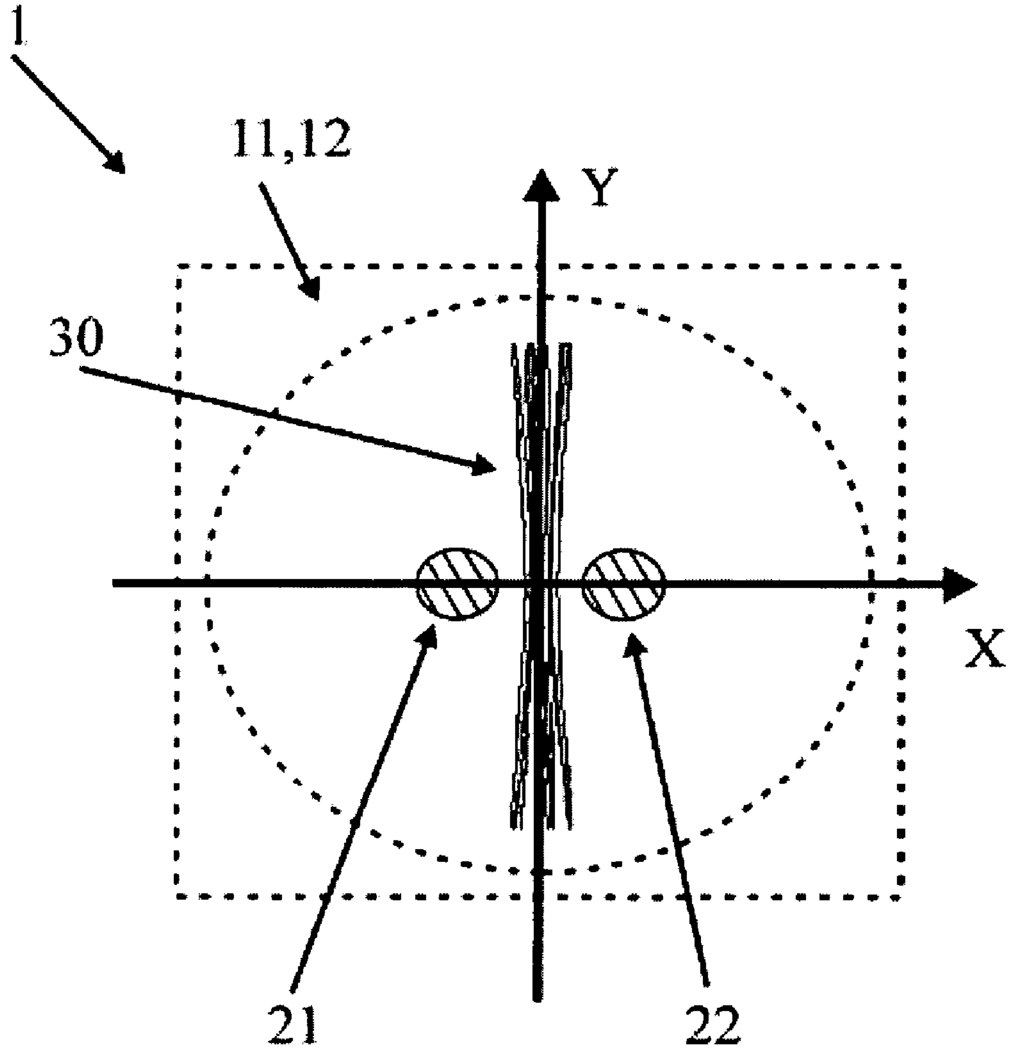
Figure 2C:
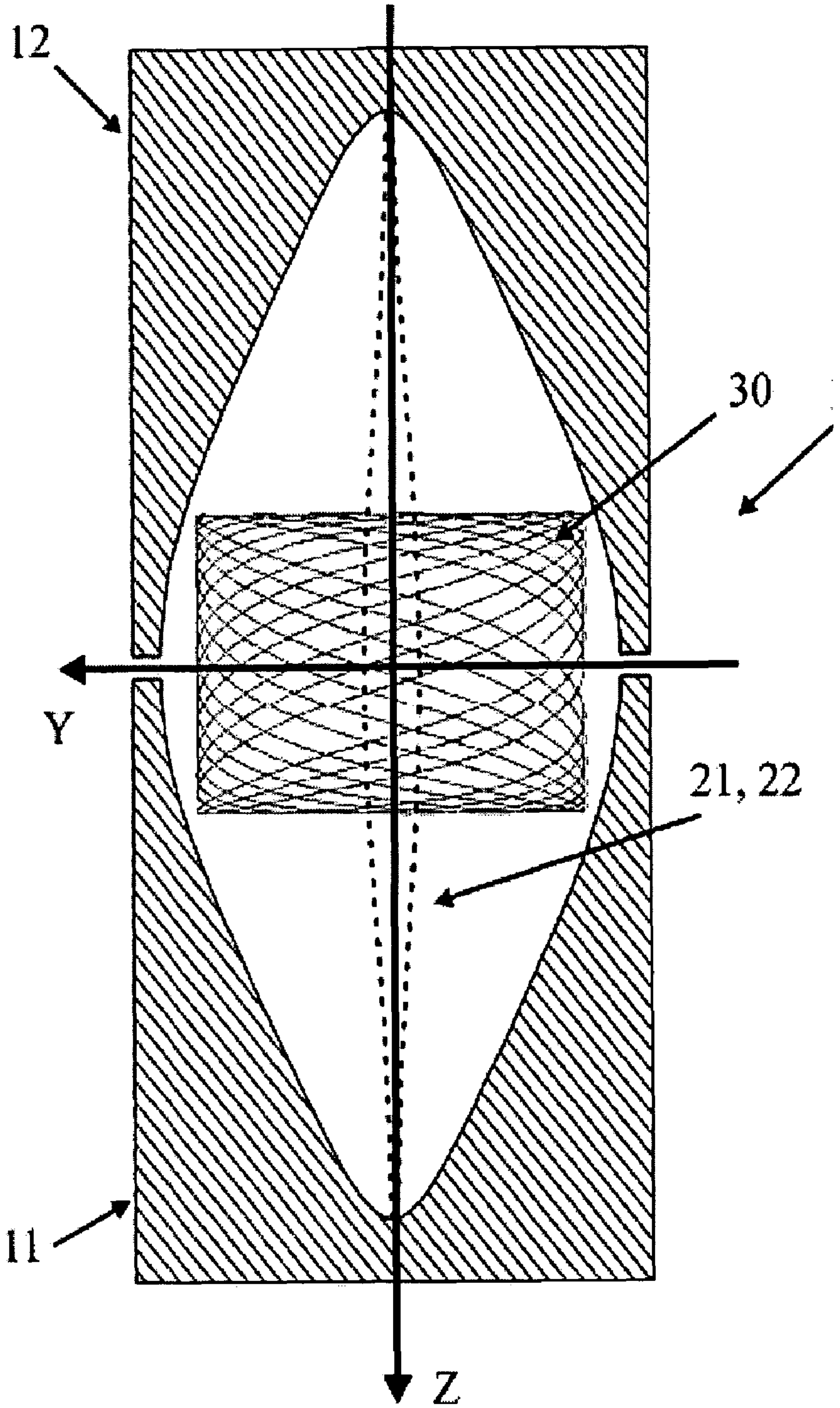

FIGS. 2A to 2C show the electrode system (1) of FIG. 1 in the x-z plane, x-y plane and y-z plane, respectively. In addition to the outer electrodes (11, 12) and the inner electrodes (21, 22), the trajectories (30) of stored ions are projected onto the respective plane.

The distance between the inner electrodes (21, 22) in the x-y plane is approximately 10 millimeters for an electrode length of around 90 millimeters. As can be seen in FIGS. 2A and 2C, the outer electrode (10) is divided into the outer electrodes (11) and (12) by the x-y plane. In FIGS. 2B and 2C, the outer electrodes (11, 12) close to the x-y plane and the inner electrodes (21, 22) are sketched.

As shown in FIGS. 2A to 2C, the ions move between the two inner electrodes (21, 22) on stable trajectories (30). The stored ions are confined between the inner electrodes (21, 22) close to the y-z plane and oscillate between opposite sides of the outer electrode (10). The motion in z-direction can be seen in FIG. 2C. The density of the trajectories (30) is lower at the potential minimum than at the two turn around points of the harmonic oscillation due to the higher velocities of the ions at the potential minimum. The distance between the two turn around points is approximately 20 millimeters. In contrast to the Orbitrap™, the ions do not rotate around an electrode with a constant kinetic energy, but oscillate also radially between two turn around points. No centrifugal forces are therefore required to keep the ions on stable radial trajectories.

Figure 3A:
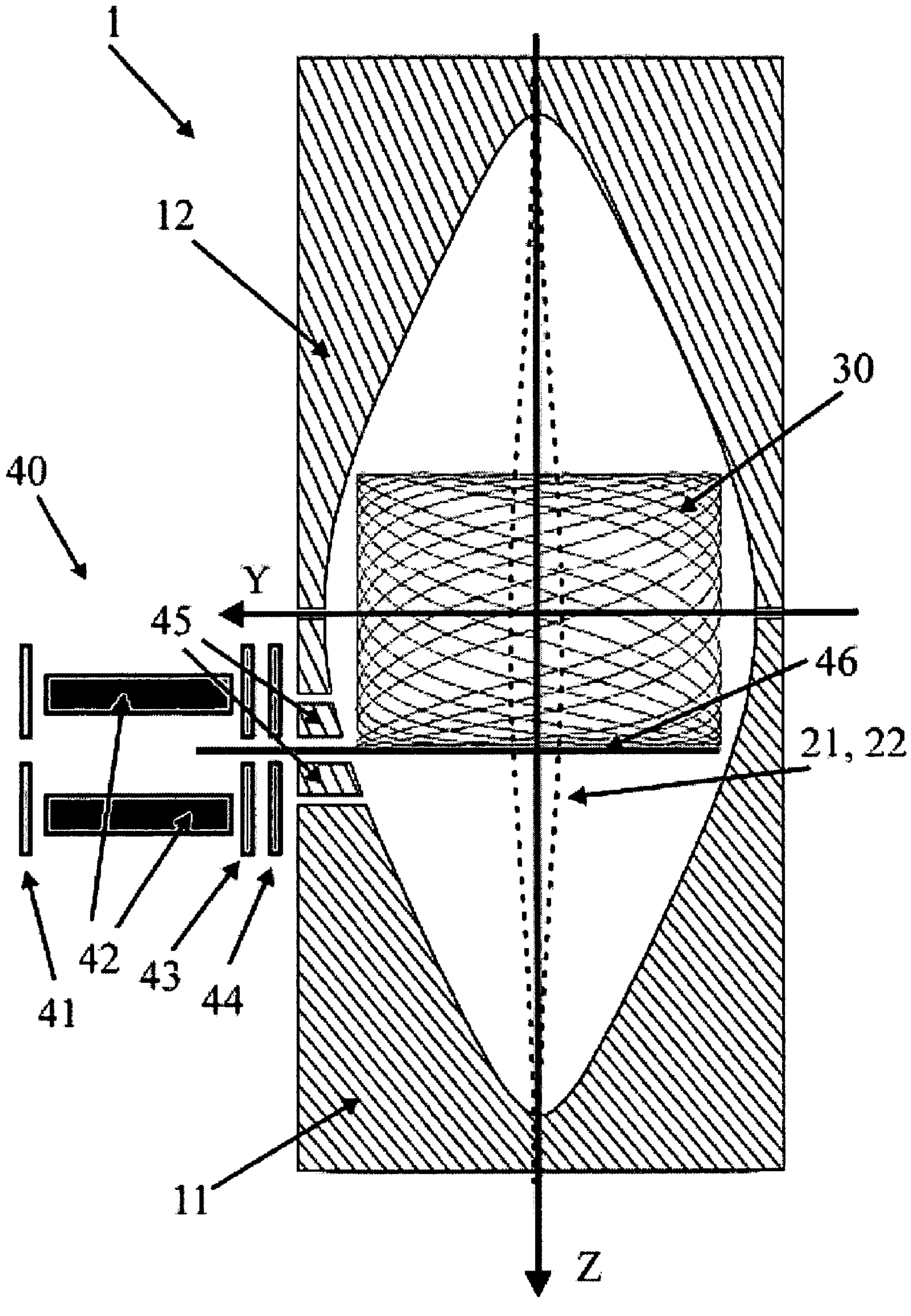
FIG. 3A shows a cross section of the electrode system (1) with an ion optic (40) for injecting ion packages into the interior of the electrode system (1). The outer electrode (11) has an opening in the y-z plane outside of the potential minimum. Ions are introduced through the opening into the electrostatic ion trap.

FIG. 3A shows a preferred ion optic (40) for injecting externally generated ions. Ions can be generated in any ion source known in the art and are guided by an ion guide system to a ring-shaped electrode (41). The ion source and the ion guide system according to the prior art are not shown here. In addition to the transfer of ions from the ion source to the ion optic (40), an ion guide system can have further functions, such as shaping ion packages and/or ion beams temporally or spatially, storing ions, selecting ions according to their mass, or fragmenting ions.

The radial confinement of ions in the ion optic (40) is achieved by a high frequency rod system (42). It is known from prior art (DE 102 21 468 A1; DE 10 2004 014 584 A1) how an axial drift of ions in the direction of the electrodes (43) and (44) can be achieved inside the rod system (42). Ions are also axially confined by repulsive DC potentials applied to the electrodes (41) and (43). The axial drift causes the ions to collect in front of the electrode (43). If there is a gas present in the rod system (42), ions will be cooled and concentrate on the axis of the rod system (42).

The electrodes (43) to (45) form a puller lens. The electrode (45) is a segment of the outer electrode (11). The ions are pulsed from the storing rod system (42) into the interior of the electrode system (1) by temporarily reducing DC potentials on the electrodes (43) to (45). The ions are injected between the inner electrodes (21, 22). Therefore, their kinetic energy can be less than 1,000 electronvolts and, more preferably, only a few tens of electronvolts, as is usual, when ions are introduced into the deflection unit of a time-of-flight mass spectrometer with orthogonal ion injection.

The electrode (45) is arranged in the y-z plane outside the minimum of the harmonic potential, so injected ions (46) immediately begin to oscillate along the z-direction. However, ions are pulsed into the electrode system (1) in a short time compared to the period length of the harmonic oscillation so that the ion packages have initially a narrow spatial distribution and thus oscillate coherently in the harmonic potential after injection for a measurement time of about a second. The opening in the electrode (45) through which the ions are injected can be circular or in the form of a slit. The slit is preferably perpendicular to the y-z plane and can have about the same length as the distance between the surfaces of the two inner electrodes. If the opening is formed like a slit, ions can be radially ejected from a high frequency rod system in form of a string (DE 195 11 333 C1) and injected into the interior of the electrode system (1) through the slit.

The injection time is limited by two factors. Firstly, the injection of each mass specific ion package should not take longer than approximately half its period length, because, otherwise, the ion package produced is not sufficiently coherent and thus can not be properly detected. Secondly, the electric potential on the electrode (45) being reduced during injection must be switched to the storage potential (in practice, ground potential) again as soon as the lightest ions to be analyzed have finished their first oscillation cycle so that they do not hit the electrode (45) again. This restriction is only valid, however, if the period length in the z-direction is an integral multiple of the radial period length. If this is not the case, the ions do not return to the position of the electrode (45) at the turn around point of the harmonic oscillation.

In order to increase the range of ion masses for a single injection and analysis, a modified ion optic can be used, as is described in patent application DE 10 2006 035 277.7. Here, ions of different masses are simultaneously introduced into an ion trap with nearly the same kinetic energy.

Figure 3B:
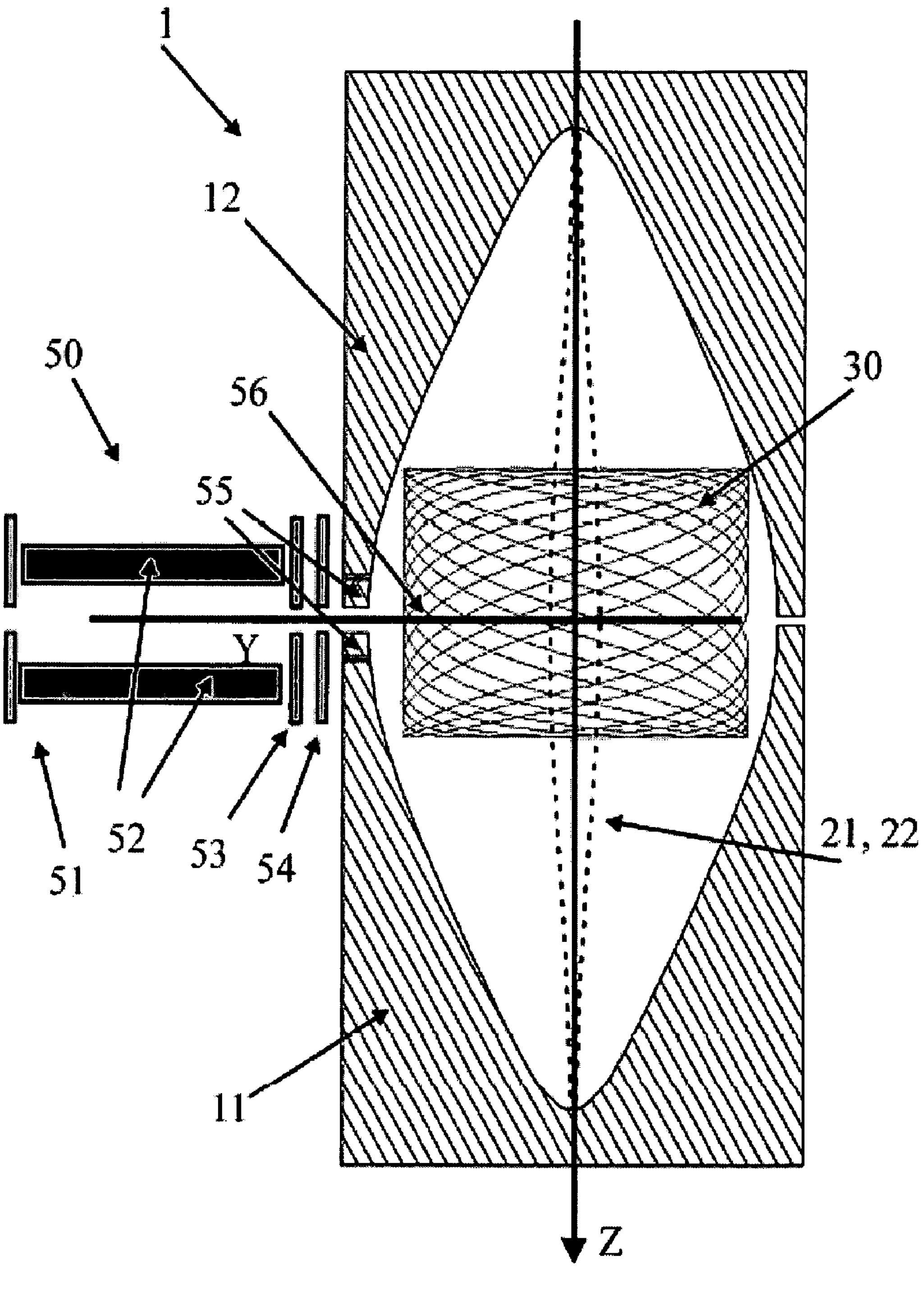
FIG. 3B shows a cross section of the electrode system (1) with an ion optic (50) for injecting ions quasi-continuously into the interior of the electrode system (1). Ions are introduced into the interior of the electrode system (1) through an opening in the y-z plane at the potential minimum.
Figure 3C:
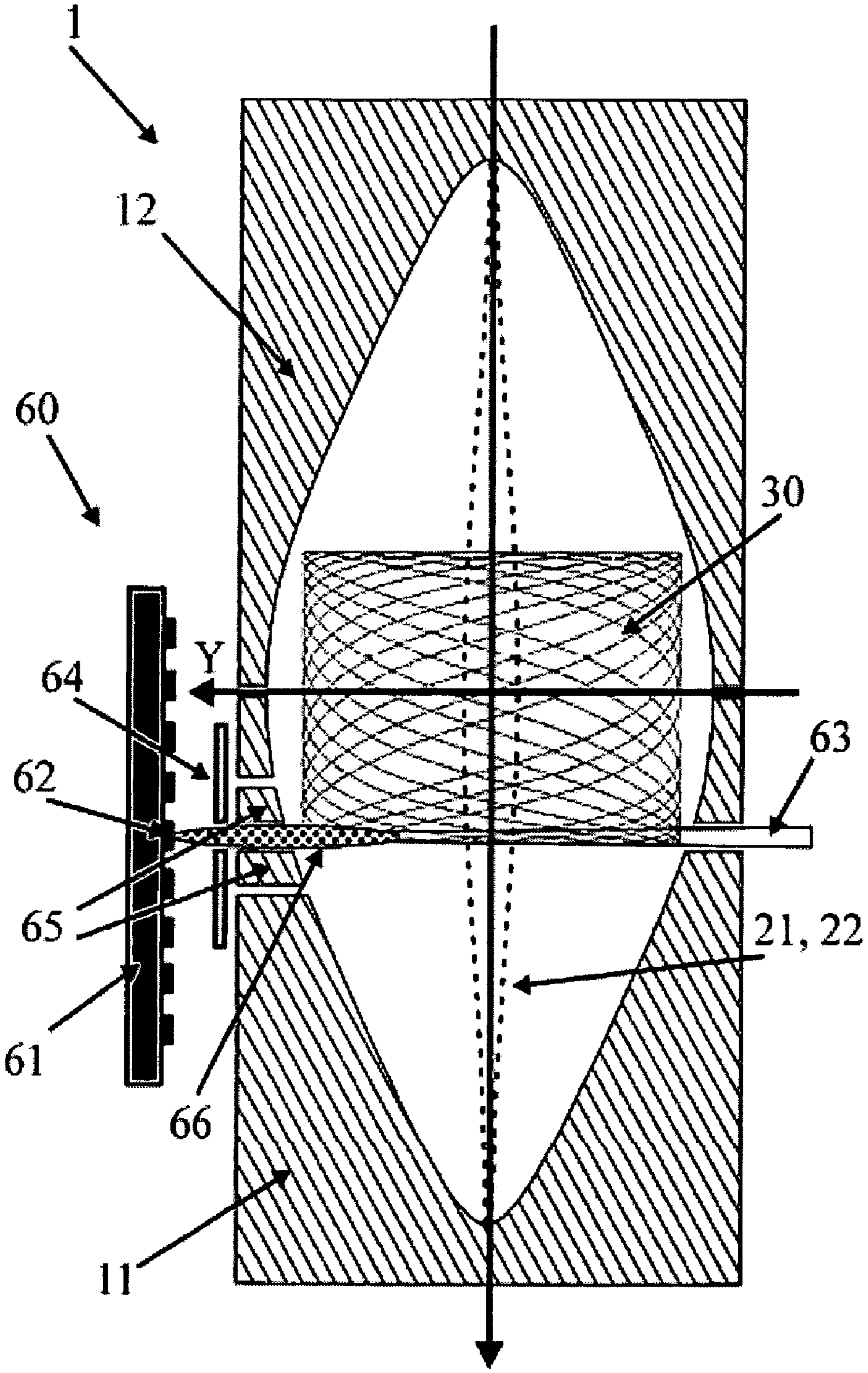
FIG. 3C shows a cross section of the electrode system (1) with a MALDI ion source (60).

In embodiments of FIGS. 3A to 3C, ion motion along the z-direction is measured as mass-dependent signal. Ions oscillating inside the harmonic potential induce image charges on the outer electrodes (11, 12). The voltages induced between the two outer electrodes (11) and (12) are electronically amplified and detected as a function of time. The electronic measuring means are known from ion cyclotron resonance mass spectrometers.

FIG. 3B shows a preferred ion optic (50) for quasi-continuous introduction of ions being externally generated in an ion source (not shown here). Ions are transferred from the ion source into a high frequency rod system (52) and stored there. Ion-repelling DC potentials applied to the electrodes (51) and (53) confine the ions in axial direction. Instead of a high frequency rod system, other high frequency ion storage devices can be used, as is the case in the preceding embodiment, for example electrode systems of successively arranged ring electrodes or diaphragms (DE 195 23 859 C2; DE 10 2004 048 496 A1).

Electrodes (53) to (55) form a puller lens. The electrode (55) is a segment of both outer electrodes (11) and (12). The ions are quasi-continuously introduced from the high frequency rod system (52) into the interior of the electrode system (1) by reducing DC potentials on the electrodes (53) to (55). An axial drift along the axis of the rod system (52) is advantageous in order to accelerate the extraction of ions from the rod system (52) into the electrostatic ion trap.

The ions are introduced in the y-z plane at the minimum of the harmonic potential. They do not move far away from the minimum of the harmonic potential due to their low kinetic energy in the z-direction. To prevent ions hitting the electrode (55) again after their first radial cycle, the electric potential of the inner electrodes (21, 22) is continuously reduced.

After the ions are introduced into the interior of electrode system (1), mass-specific ion packages are excited to coherent motion. Excitation of coherently oscillating ion packages can be achieved by applying a transient high frequency voltage between the outer electrodes (11) and (12) which generates an electric dipole field in z-direction. Appropriate mixtures of frequencies for exciting ion packages with different ion masses are known from ion cyclotron resonance mass spectrometers. A pulsed dipole field along the z-direction can be used to excite coherent oscillations for all masses at the same time as well.

FIG. 3C shows the electrode system (1) with a MALDI ion source (60) (MALDI=Matrix Assisted Laser Desorption and Ionization). The MALDI ion source (60) consists of a sample support (61), a sample (62) provided on the sample support (62) and electrodes (64) and (65). The outer electrode (11) is segmented by the electrode (65).

The sample support (61) can be moved by a movement device (not shown). Thereby, different positions of the sample (62) and further samples being additionally provided on the sample support (61) can be successively moved into the focus of a pulsed laser beam (63). The laser system for generating and focusing the pulsed laser beam (61) is not shown in FIG. 3C.

The sample (62) contains analyte molecules embedded in a solid polycrystalline matrix. The pulsed laser beam (63) is focused onto the sample (62) through two openings of the outer electrode (11). The pulsed irradiation causes the solid matrix to explosively convert into gaseous phase. The ionization of the analyte molecules takes place in the vaporization cloud (66).

As is the case with the two preceding embodiments, the ions are injected between both inner electrodes (21, 22). Like in FIG. 3A, the electrode (65) through which ions are injected is located again outside the minimum of the harmonic potential. During ion injection, DC potentials on the sample support (61) and on the electrodes (64, 65) can be switched so that the ions in the vaporization cloud (66) are drawn and focused (in space and time) into the interior of the electrode system (1). The short duration of the laser pulse (63), which in practice lasts only a few nanoseconds or less, and the pulsed DC potentials result in ion packages inside the electrode system (1) which initially have spatial distributions that are sufficiently narrow to detect their harmonic oscillations along the z-direction.

The distance between the sample support (61) and the inside of the outer electrode (11) is preferably less than 50 millimeters; particularly preferred is less than 25 millimeters, and here especially a mere 5 millimeters. It is, however, also possible to directly position a sample support at an opening of the outer electrode (11) without any additional electrodes.

Since the vaporization cloud (66) expands adiabatically, ions inside the vaporization cloud (66) gain a velocity component that is independent of their mass. Therefore, the kinetic energy of those MALDI generated ions varies substantially. However, the electrode system (1) depicted in FIGS. 1 to 3 can store ions generated by the MALDI ion source (60), if they are injected between both inner electrodes (21, 22). In addition, the mean kinetic energy can be less than 1,000 electronvolts.

The ions can also be injected at the minimum of the harmonic potential and subsequently excited to harmonic oscillations by a transient electric dipole field. It is also possible to use other ion sources which ionize analyte molecules provided on a sample support.

Figure 4A:
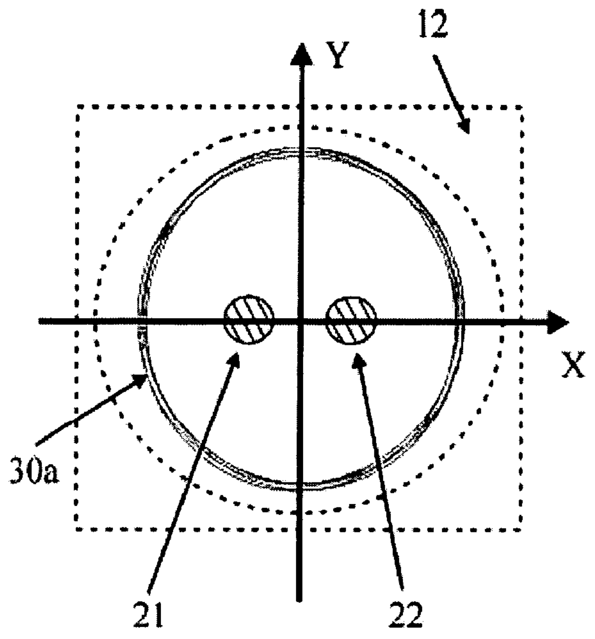
FIGS. 4A and 4B show a cross section of the electrode system (1) in the x-y plane with a circular ion trajectory and a trajectory in the form of a lemniscate, respectively (30*a*, 30*b*).
Figure 4B:
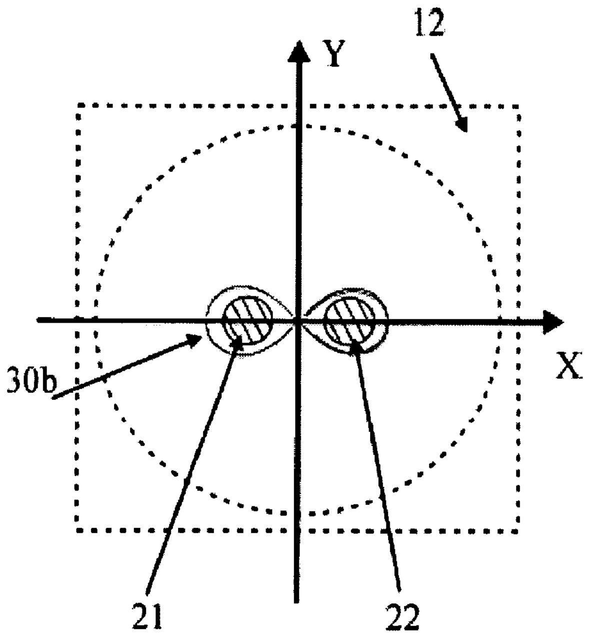

FIGS. 4A and 4B show two other stable, radial ion trajectories (30*a*, 30*b*) for the electrode system (1). While the ions in FIG. 4A move along a circular trajectory (30*a*) around both inner electrodes (21, 22), the trajectory (30*b*) in FIG. 4B is in the form of a lemniscate. The term "trajectory in the form of a lemniscate" denotes a trajectory which corresponds to or resembles a figure of rotated "8" (∞). The ions can also move on even more complex stable trajectories which, compared to a lemniscate, have more than two loops or more than one crossing point.

The ions are introduced onto the trajectories (30*a*, 30*b*) by tangentially injecting them into the electrode system (1). For this, the voltage supply of the outer electrode (11, 12) and the inner electrodes (21, 22), and their segments, can be supplied in the form that it provides temporally adjustable electric potentials or that it can switch between different electric potentials. The electrodes (11, 12, 21, 22) of the electrode system (1) can, for instance, be switched to ground potential during the injection of ions in order to introduce them with suitable starting conditions into a field-free electrode system (1). After the electric potentials on the electrodes (11, 12, 21, 22) are switched back or settled to the electric storage potentials, injected ions remain stored on stable trajectories in the electrode system (1).

It is particularly preferable to use the previously mentioned ion optic from the patent application DE 10 2006 035 277.7 for a tangential injection. In FIGS. 4A and 4B, the kinetic energy of ions will approximately be 3,000 electronvolts, if stored in the electrode system (1) with a voltage of approximately 10,000 volts between the outer electrode (10) and both inner electrodes (21, 22). The kinetic energy is required to keep the ions on stable radial trajectories.

Figure 5:
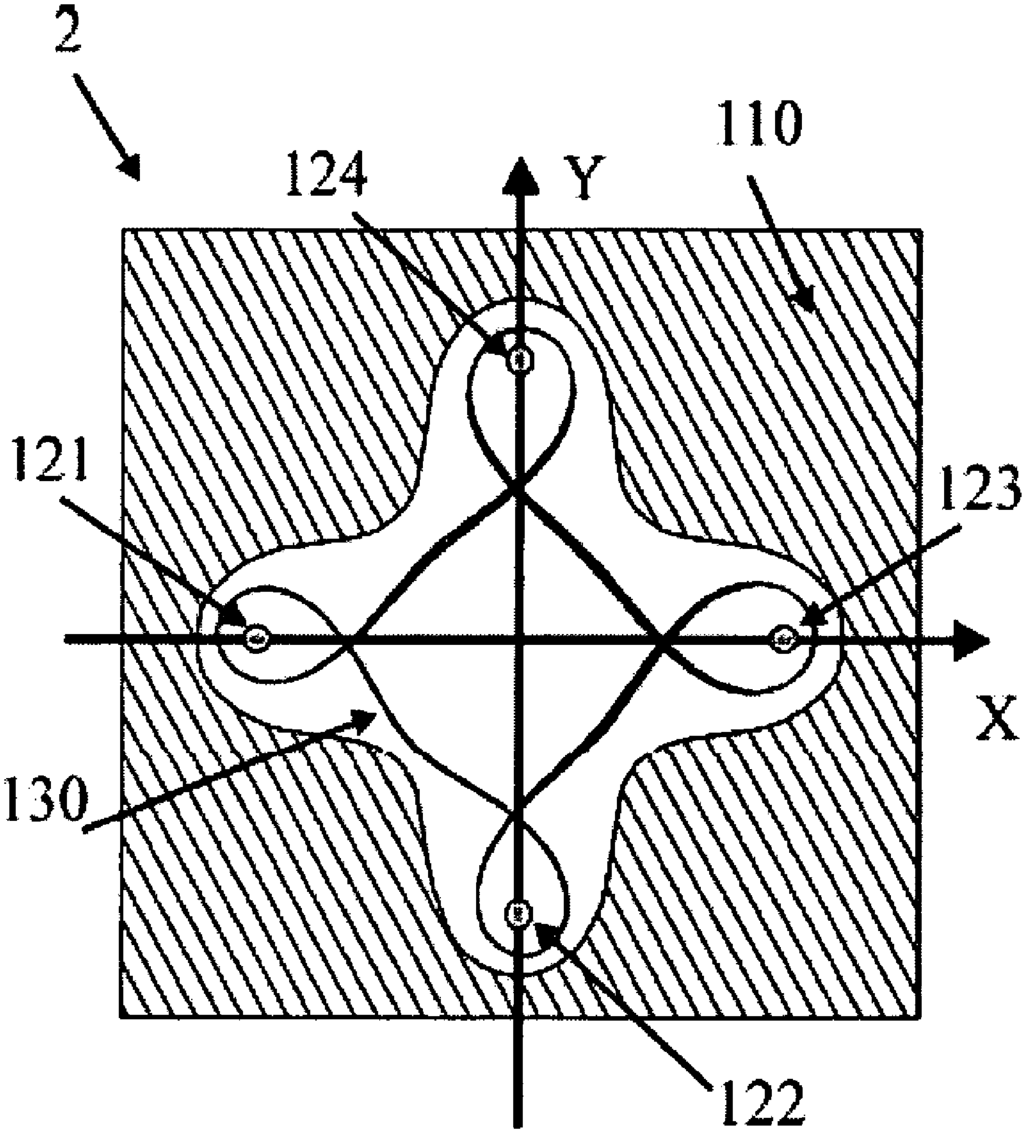
FIG. 5 shows a cross section of an electrode system (2) with an outer electrode (110) and four spindle-shaped inner electrodes (121, 122, 123, 124) in the x-y plane. Ions move on a stable trajectory (130) in the shape of a cloverleaf.

FIG. 5 shows another preferred electrode system (2) with an outer electrode (110) and four spindle-shaped inner electrodes (121, 122, 123, 124) in the x-y plane. The ions move radially on a stable trajectory (130) in the form of a cloverleaf around the four inner electrodes (121, 122, 123, 124). Here too, the ions can be injected tangentially into the interior of the electrode system.

For those skilled in the art it is easy to derive further electrode systems according to the invention in which the ions move on stable radial trajectories and oscillate harmonically along the z-direction.

What is claimed is:

1. A mass spectrometer with an electrostatic ion trap connected to a voltage supply for applying electric potentials thereto, the mass spectrometer comprising:

an outer electrode having ion-repelling electric potentials applied thereto;

a plurality of inner electrodes, each having an ion-attracting electric potential applied thereto, wherein the outer electrode and the inner electrodes are shaped and arranged in such a way that the electric potential between the outer electrode and the inner electrodes corresponds to a superposition of partial electric potentials of following form:

$$U(x,y,z)=U_o+U_C\cdot\ln\left[\frac{(X^2+Y^2)^2-2\cdot b^2\cdot(X^2-Y^2)+b^4}{a^4}\right]+k_x\cdot x^2+k_y\cdot y^2+k_z\cdot z^2$$

wherein x, y and z are Cartesian coordinates, $X=(x+x_o)\cdot\cos(\alpha)$, $Y=(y+y_o)\cdot\sin(\alpha)$ and $x_o$, $y_o$, $\alpha$, $U_0$, $U_C$, a, b, $k_x$, $k_y$ and $k_z$ are parameters where the sum over the parameters $k_x$, $k_y$ and $k_z$ is equal to zero, the parameter $k_z$ is larger than zero and the parameter b is not equal to zero.

2. The mass spectrometer according to claim 1, wherein each of the plurality of inner electrodes has a spindle shape, and the electric potential between the outer electrode and the plurality of spindle-shaped inner electrodes corresponds to an electric potential of following form:

$$U(x,y,z)=U_o+U_C\cdot\ln\left[\frac{(x^2+y^2)^2-2\cdot b^2\cdot(x^2-y^2)+b^4}{a^4}\right]-\frac{k}{2}\cdot(x^2+y^2)+k\cdot z^2.$$

3. The mass spectrometer according to claim 2, wherein the inner surface of the outer electrode and outer surfaces of the spindle-shaped inner electrodes correspond to equipotential surfaces of the electric potential U(x,y,z).

4. The mass spectrometer according to claim 2, wherein the outer electrode has an opening therein, which opening is located in a plane of symmetry between the spindle-shaped inner electrodes.

5. The mass spectrometer according to claim 4, wherein the aperture has one of a circular shape and a slit shape with a long dimension perpendicular to the plane of symmetry.

6. The mass spectrometer according to claim 4, further comprising:

an ion source;

an ion optic; and an ion guide system that transfers ions from the ion source to the ion optic, the ion optic being located between the ion guide system and the opening in the outer electrode and adapted to introduce ions through the opening into an interior of the electrostatic ion trap.

7. The mass spectrometer according to claim 4, further comprising an ion source with a sample support and an ion optic, the ion optic being located between the sample support and the opening in the outer electrode.

8. The mass spectrometer according to claim 7, wherein the ion source is a MALDI ion source.

9. The mass spectrometer according to claim 6 or 7, wherein the ion optic comprises a power supply which generates temporally adjustable voltages so that ions are pulsed into the electrostatic ion trap.

10. The mass spectrometer according to claim 2, wherein at least one of the electrodes of the electrostatic ion trap is segmented and the electrode system comprises additional, auxiliary electrodes.

11. The mass spectrometer according to claim 2, wherein the voltage supply comprises a mechanism that generates temporally adjustable voltages that are applied to the electrodes.

12. The mass spectrometer according to claim 2, wherein the electrostatic ion trap has a z-axis and comprises an ion detector which measures one of a motion of ions along the z-axis and a radial motion of ions as a function of time.

13. The mass spectrometer according to claim 12, wherein the ion detector comprises detection elements in which ions induce electric signals due to their oscillations along the z-axis.

14. The mass spectrometer according to claim 13, wherein the detection elements are segments of the electrodes of the electrostatic ion trap.

15. A method for the introduction of externally-generated ions into an electrostatic ion trap comprising:

(a) providing an outer electrode for the trap with ion-repelling electric potentials applied thereto;

(b) providing a plurality of inner electrodes for the trap, each inner electrode having a spindle shape and an ion attracting potential applied thereto, the outer electrode and the inner electrodes being shaped and arranged so that the electric potential between the outer electrode and the plurality of spindle-shaped inner electrodes corresponds to a harmonic electric potential of following form:

$$U(x,y,z)=U_o+U_C\cdot\ln\left[\frac{(X^2+Y^2)^2-2\cdot b^2\cdot(X^2-Y^2)+b^4}{a^4}\right]+k_x\cdot x^2+k_y\cdot y^2+k_z\cdot z^2;$$

and (c) injecting the ions via an ion optic through an opening in the outer electrode, which opening is located in a plane of symmetry between the inner electrodes and outside a minimum of the harmonic electric potential.

16. The method according to claim 15, wherein electric potentials applied to the electrodes of the electrostatic ion trap are reduced during the injection.

17. A method for the introduction of externally-generated ions into the electrostatic ion trap comprising:

(a) providing an outer electrode for the trap with ion-repelling electric potentials applied thereto;

providing a plurality of inner electrodes for the trap, each inner electrode having a spindle shape and an ion attracting potential applied thereto, the outer electrode and the inner electrodes being shaped and arranged so that the electric potential between the outer electrode and the plurality of spindle-shaped inner electrodes corresponds to a harmonic electric potential of following form:

$$U(x,y,z)=U_o+U_C\cdot\ln\left[\frac{(X^2+Y^2)^2-2\cdot b^2\cdot(X^2-Y^2)+b^4}{a^4}\right]+k_x\cdot x^2+k_y\cdot y^2+k_z\cdot z^2;$$

and (c) injecting the ions via an ion optic through an opening in the outer electrode, which opening is located in a plane of symmetry between the inner electrodes and in a minimum of the harmonic electric potential.

18. The method according to claim 17, wherein the electric potential applied to the inner electrodes is continuously reduced during the introduction of the ions.

19. The method according to claim 15 or 17, wherein the ions have a kinetic energy of less than 1,000 electronvolts during the injection into the electrostatic ion trap.

20. The method according to claim 15 or 17, wherein the ions have a kinetic energy of less than 100 electronvolts during the injection into the electrostatic ion trap.

* * * * *